(No Model.)
W. J. CONROY.
VEHICLE SPRING.
No. 350,660. Patented Oct. 12, 1886.
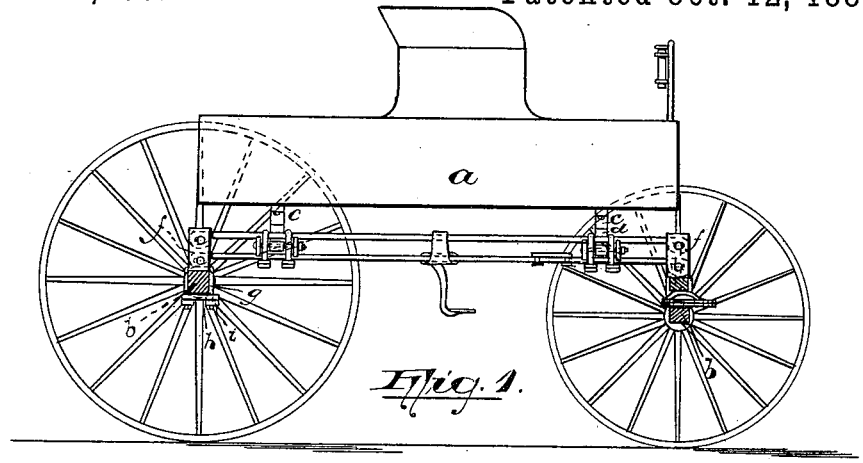
Fig. 1.
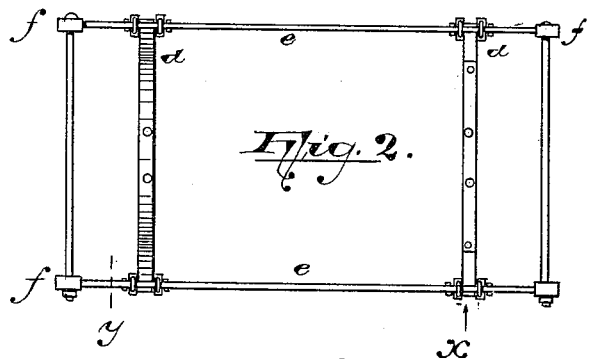
Fig. 2.
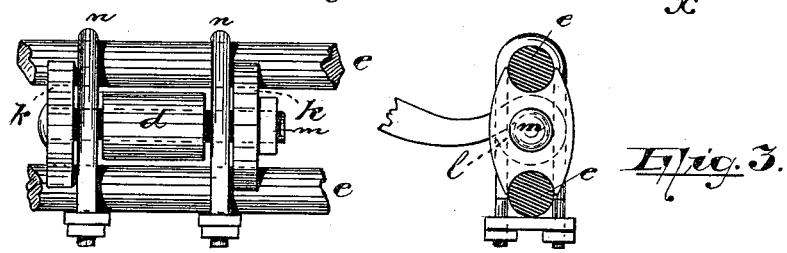
Fig. 3.
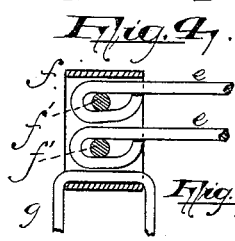
Fig. 4.
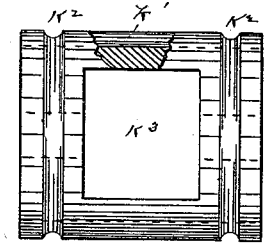
Fig. 6.
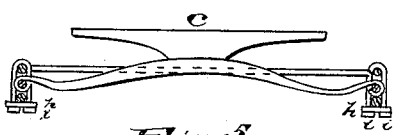
Fig. 5.
Fig. 7.
WITNESSES: Fredk F Campbell, McGrath
INVENTOR: William J. Conroy,
BY Drake & Co, ATT'YS.

UNITED STATES PATENT OFFICE.

WILLIAM J. CONROY, OF LIBERTY CORNER, NEW JERSEY.

VEHICLE-SPRING.

SPECIFICATION forming part of Letters Patent No. 350,660, dated October 12, 1886.

Application filed March 4, 1886. Serial No. 193,962. (No model.)

*To all whom it may concern:*

Be it known that I, WILLIAM J. CONROY, a citizen of the United States, residing at Liberty Corner, in the county of Somerset and State of New Jersey, have invented certain new and useful Improvements in Wagon-Springs; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to reduce the cost of manufacturing vehicle-springs, and to secure increased strength and durability therein; and it consists in the peculiar arrangement and combinations of parts, substantially as will be hereinafter set forth, and finally embodied in the clauses of the claim.

Referring to the accompanying drawings, in which like letters indicate corresponding parts in each of the several figures, Figure 1 is a side elevation illustrating a wagon or vehicle having the improved spring applied thereto. Fig. 2 is a plan illustrating the relation of the side springs to the transverse springs upon which the bolsters rest. Fig. 3 is a sectional view taken through line $x$, and Fig. 4 is a side view showing in detail the connection of the side and transverse springs. Fig. 5 is a sectional view of the frame formed by the side and transverse springs, taken through line $y$; and Figs. 6 and 7 illustrate certain detail modifications.

In said drawings, $a$ indicates the wagon-body. $b\ b$ are ordinary axles for the wheels. $c\ c$ are ordinary bolsters to support the body, and $d\ d$ are transverse springs, supporting said bolsters in any ordinary manner. The ends of the transverse springs are coupled or attached to side springs, $e\ e$, which correspond more or less closely in position to the ordinary side bars. Said side springs are preferably of round or oval steel rods, arranged parallel with one another a little way apart, as indicated in Figs. 1, 3, and 4. Said rods are fixed at their ends in shackles $f$, said ends preferably being turned to form eyes through which bolts $f'\ f'$ pass to hold said rods in said shackles, and the said shackles are provided with clip-arms $g\ g$, by means of which and a clip-bar or plate, $h$, and nuts $i$, said shackles are secured to the axle $b$, or in some cases to the bolster. The cross or transverse springs connecting with the bolsters are joined to the side springs at suitable points between the shackles. The manner of joining or coupling the said transverse springs to the side springs is shown more clearly in Fig. 1, in which $k\ k$ are pieces inserted between the rods $e$, having notched or recessed ends and central bearings, $l$, for a bolt, $m$, upon which last the lateral springs are secured. The parts are then firmly secured together by a clip, $n$, which holds the said rods in their respective sockets, substantially as above set forth. The spring-rods $e\ e$ are of steel, and are of any size adapted to suit the weight of the vehicle body and the elasticity desired. The bars may be arranged either in the vertical position shown or horizontally. The eyes formed at the ends thereof may fit closely on the bolts $f'$, or a little play may be allowed, as in Fig. 7, and a block of rubber may be forced into the shackles to prevent rattle.

Modifications in the construction of the portion $k$ may be made, as illustrated by Fig. 6, in which a single piece takes the place of the two shown in Fig. 4. In this piece upper and lower grooves, $k'$, are formed for the spring-bars $e\ e$, lateral grooves $k^2$, for the clips $n$, a central bearing for the bolt $m$, and an aperture, $k^3$, for the end of the transverse spring, all as will be understood.

Other changes and modifications may be made in the construction of the device than are herein provided for without departing from the spirit of the invention.

I am aware that vehicles have been provided at the sides with elliptical springs composed of flat leaves, and I do not claim the same herein. The improved springs are preferably of round and longitudinally straight rods of steel, by means of which increased stiffness and strength is obtained for the amount of metal employed, and a certain lateral spring movement is allowed to the wagon-body that cannot be obtained, at least to the same degree, by a flat and horizontally-disposed spring. It is not essential that these springs be exactly round;

but to secure the best results the springs should be horizontally and vertically of equal diameter.

Having thus described the invention, what I claim as new is—

1. In combination, in a vehicle with the transverse springs, the rods $e\ e$, shackles $f$, piece $k$, bolt $m$, and clips $n$, all arranged and combined substantially as and for the purposes set forth.

2. In a vehicle, the combination, with the transverse and side springs, of a piece, $k$, having upper and lower grooves or recesses to receive the said side springs, a bolt to receive the transverse springs, and suitable clips to keep the side springs in the said grooves or recesses, substantially as set forth.

3. In combination, in a vehicle with the body $a$, axles $b$, bolsters $c$, and transverse springs supporting said bolsters, side springs, $e$, longitudinally straight and of equal diameter vertically and horizontally, and having their ends secured to said axles, substantially as and for the purposes set forth.

In testimony that I claim the foregoing, I have hereunto set my hand this 19th day of February, 1886.

W. J. CONROY.

Witnesses:
   FREDK. F. CAMPBELL,
   OSCAR A. MICHEL.